United States Patent
Han et al.

(10) Patent No.: US 8,578,213 B2
(45) Date of Patent: Nov. 5, 2013

(54) ANALYZING SOFTWARE PERFORMANCE ISSUES

(75) Inventors: Shi Han, Beijing (CN); Yingnong Dang, Beijing (CN); Song Ge, Beijing (CN); Dongmei Zhang, Bellevue, WA (US); Bin Zhao, Beijing (CN); Feng Liang, Beijing (CN); Chao Bian, Beijing (CN); Xiangpeng Zhao, Beijing (CN); Cong Chen, Beijing (CN); Hang Li, Redmond, WA (US); Prashant Ratanchandani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 13/095,269

(22) Filed: Apr. 27, 2011

(65) Prior Publication Data

US 2012/0278658 A1  Nov. 1, 2012

(51) Int. Cl.
  *G06F 11/00*  (2006.01)
(52) U.S. Cl.
  USPC ........................................................ 714/38.1
(58) Field of Classification Search
  USPC ........................................ 714/38.1; 717/133
  See application file for complete search history.

(56) References Cited

U.S. PATENT DOCUMENTS

| | | | |
|---|---|---|---|
| 6,675,164 B2 | 1/2004 | Kamath et al. | |
| 7,178,132 B2 | 2/2007 | Pierce | |
| 7,320,125 B2 | 1/2008 | Elliott et al. | |
| 7,610,514 B2 | 10/2009 | Modani et al. | |
| 7,644,397 B2 | 1/2010 | Warren et al. | |
| 7,657,875 B2 | 2/2010 | Alexander, III et al. | |
| 7,703,074 B2 | 4/2010 | Kamen et al. | |
| 7,730,460 B1 | 6/2010 | Warren et al. | |
| 7,739,553 B2 | 6/2010 | Bendapudi et al. | |
| 7,818,799 B2 | 10/2010 | Chen et al. | |
| 7,823,006 B2 | 10/2010 | Grant et al. | |
| 2007/0022142 A1 | 1/2007 | Palmer et al. | |
| 2007/0143759 A1 | 6/2007 | Ozgur et al. | |
| 2007/0283338 A1 | 12/2007 | Gupta et al. | |
| 2008/0082968 A1* | 4/2008 | Chang et al. | 717/128 |
| 2009/0006883 A1* | 1/2009 | Zhang et al. | 714/1 |
| 2009/0187791 A1 | 7/2009 | Dowling et al. | |
| 2009/0228685 A1 | 9/2009 | Wei et al. | |
| 2009/0320021 A1 | 12/2009 | Pan et al. | |
| 2010/0107145 A1* | 4/2010 | Warren et al. | 717/131 |

OTHER PUBLICATIONS http://www.computer.org/csdl/mags/co/2009/08/index.html, "Data Mining for Software Engineering," pp. 55-62, Xie et al., Aug. 2009.*
http://www.mathcs.emory.edu/~lxiong/research/pub/larosa08frequent.pdf, "Frequent Pattern Mining for Kernel Trace Data," LaRosa et al., Nov. 20, 2008.*

(Continued)

*Primary Examiner* — Michael Maskulinski
*Assistant Examiner* — Neil Miles
(74) *Attorney, Agent, or Firm* — Lee & Hayes, PLLC (57) ABSTRACT

Execution traces are collected from multiple execution instances that exhibit performance issues such as slow execution. Call stacks are extracted from the execution traces, and the call stacks are mined to identify frequently occurring function call patterns. The call patterns are then clustered, and used to identify groups of execution instances whose performance issues may be caused by common problematic program execution patterns.

20 Claims, 9 Drawing Sheets

(56) References Cited

OTHER PUBLICATIONS

Liu et al. ("Mining Behavior Graphs for "Backtrace" of Noncrashing Bugs," SIAM International Conference on Data Mining, 2005).*

Joachims ("Support Vector Machine for Ranking," Cornell University, Dept. of Computer Science, Mar. 21, 2009).*

Bartz, et al., "Finding Simliar Failures Using CallStack Similarity", SysMl'08 Proceedings of the 3rd Conference on Tackling computer system problems with machine learning techniques, USENIX Association, 2008, 6 pages.

Brodie, et al., "Quickly Finding Known Software Problems via Automated Symptom Matching", The Computer Society, Proceedings of the Second International Conference on Autonomic Computing (ICAC'05) 2005, 10 pages.

Buehrer, et al., "Adaptive Parallel Graph Mining for CMP Architectures," International Conference on Data Mining (ICDM'06), Dec. 18-22, 2006, Published Jan. 8, 2007, retrieved at <<http://www.cse.ohio-state.edu/~tatikond/work/parallel/greg-icdm.pdf>>, pp. 1-10.

Cong, et al., "A Sampling-based Framework for Parallel Data Mining," PPoPP'05, Jun. 15-17, 2005, Chicago, Illinois, USA, Copyright 2005 ACM, retrieved at <<http://www.cs.uiuc.edu/class/fa06/cs498dp/papers/ppopp.pdf>>, 11 pages.

Cong, et al., "Parallel Mining of Closed Sequential Patterns," KDD'05, Aug. 21-24, 2005, Chicago, Illinois, USA, Copyright 2005, retrieved at <<http://www.cs.uiuc.edu/class/fa05/cs591han/kdd05/docs/p562.pdf>>, pp. 562-567.

Guralnik, et al., "Dynamic Load Balancing Algorithms for Sequence Mining," May 4, 2001, retrieved from http://glaros.dtc.umn.edu/gkhome/fetch/papers/sc2001tp.pdf>>, pp. 1-8.

Huck, et al., "PerfExplorer: A Performance Data Mining Framework for Large-Scale Parallel Computing", SCI'05 Nov. 2005, Seattle, WA USA, 12 pages.

Jinlin, et al., "Parallel Research of Sequential Pattern Data Mining Algorithm," 2008 International Conference on Computer Science and Software Engineering, retrieved at <<http://ieeexplore.ieee.org/stamp/stamp.jsp?tp=&arnumber=4722632>>, pp. 348-353.

Liu, et al., "A Systematic Study of Failure Proximity", IEEE Transactions on Software Engineering, vol. 32, No. 6, Nov./Dec. 2008, pp. 826-843.

Takaki, et al., "A New Dynamic Load Balancing Technique for Parallel Modified PrefixSpan with Distributed Worker Paradigm and Its Performance Evaluation," High-Performance Computing, Lecture Notes in computer Science, 2008, vol. 4759/2008, retrieved at <<http://www.springerlink.com/content/t8nr70h55uvw6r42/fulltext.pdf>>, 11 pages.

Wang, et al. "BIDE: efficient mining of frequent closed sequences", Data Engineering, 2004. Proceedings, 20th International Conference, 79-90.

Office action for U.S. Appl. No. 13/095,415, mailed on Apr. 11, 2013, Han et al., "Frequent Pattern Mining," 20 pages.

\* cited by examiner

Fig. 10

ANALYZING SOFTWARE PERFORMANCE ISSUES

BACKGROUND

With the increasing sophistication and complexity of personal computers, performance issues have become increasingly difficult to analyze. Modern personal computers have multiple processors or CPUs, and commonly employ multi-tasking and multi-threading. Furthermore, users install virtually infinite combinations of applications, and configure their computers in many different ways. These factors combine to make it very difficult to pinpoint causes of slow performance or other performance issues.

Technologies exist for collecting information from individual computers when they encounter performance issues such as lack of responsiveness. Assuming users have given permission, an operating system can monitor system performance at various levels of granularity, detect when issues arise, and report system information relevant to the point in time when the issues occurred. In any individual case, this information may include a system trace showing a timeline of execution events that occurred before, during, and after the performance issue. These events include function-level calls, and the traces indicate sequences of such calls that occur in a time period surrounding any performance issues. Such sequences are referred to as callback sequences or call stacks.

Call stacks can be evaluated by analysts to determine causes of performance and responsiveness issues. However, the scale of this evaluation is daunting. Operating system traces may be collected from thousands or millions of users, and each trace may be very large. Furthermore, the traces come from computers having various different configurations, and it can become very difficult for analysts to isolate common issues.

Note that this can be much more difficult than analyzing the cause of a system or component crash. In the case of a crash, a particular execution point can be identified, and execution can be traced directly backward from that point to determine the cause of the crash. This is not possible when analyzing causes of slow performance, because there is no single point that can be so closely correlated with the symptom.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

SUMMARY

Slow performance issues can be analyzed by collecting execution traces from multiple computers exhibiting such issues. The execution traces can be parsed and filtered to produce call stacks, each of which indicates a sequence of function calls. The call stacks can be mined to identify frequently occurring function call patterns. The patterns can then be clustered. This allows analysts to identify groups of execution instances whose performance issues may be caused by common problematic execution patterns.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described herein are techniques for evaluating system traces to identify causes of performance issues such as slow execution. It is assumed for purposes of analysis that systems exhibit different performance issues, each of which is caused by a problematic program execution pattern. It is further assumed that each such problematic program execution pattern leaves evidence in the form of a one or more function call patterns. The described techniques attempt to identify groups or clusters of execution instances based on similarity of function call patterns, wherein the execution instances of each cluster are related to a particular performance issue. This is done in a way that allows automatic discovery of problematic execution patterns in very large numbers of execution instances. It also allows analysts to more easily isolate and prioritize issues.

Analysis Framework

Figure 1:
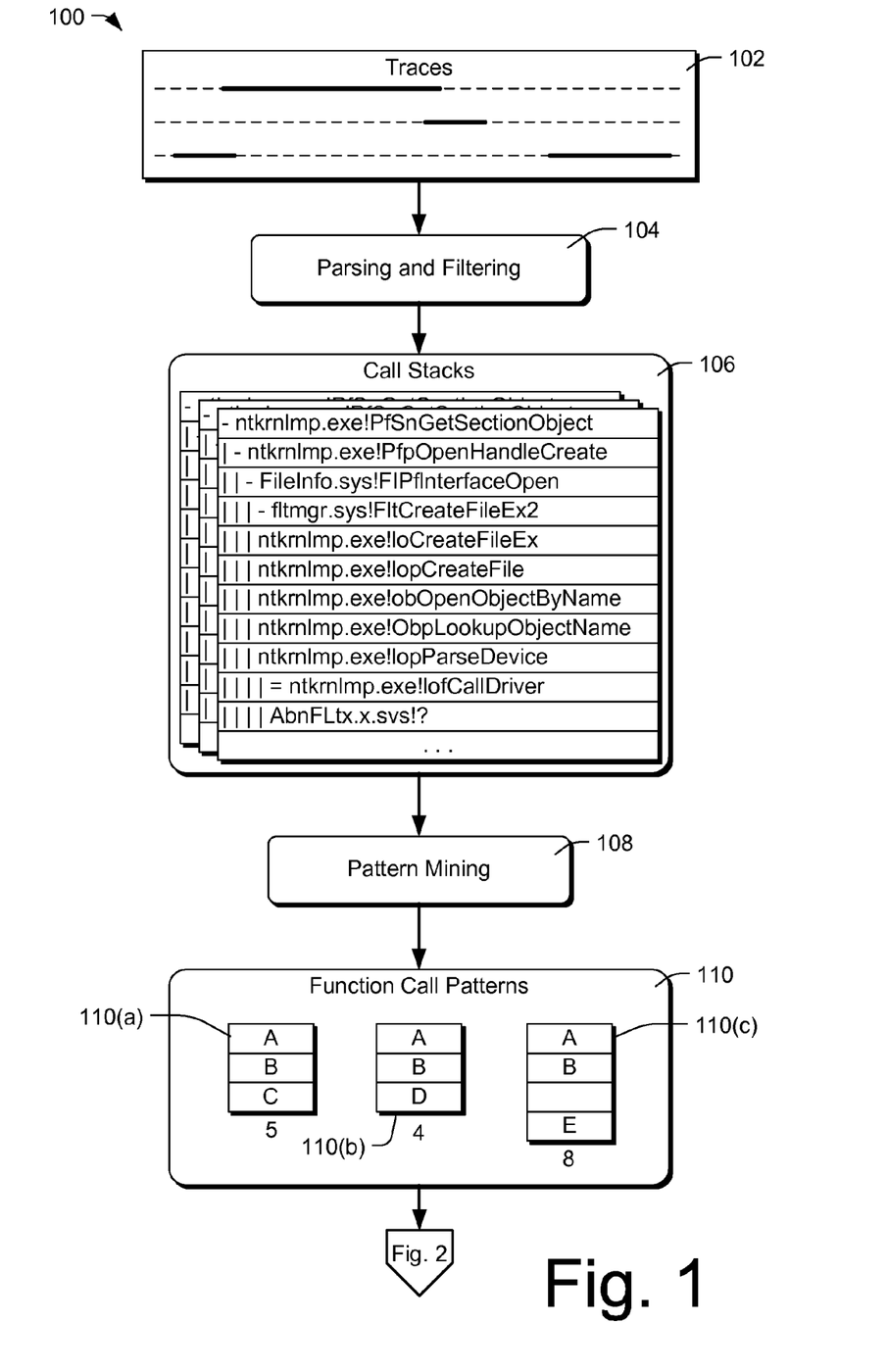
FIGS. 1 and 2 comprise a flow diagram illustrating techniques of analyzing slow performance in accordance with certain embodiments.
Figure 2:
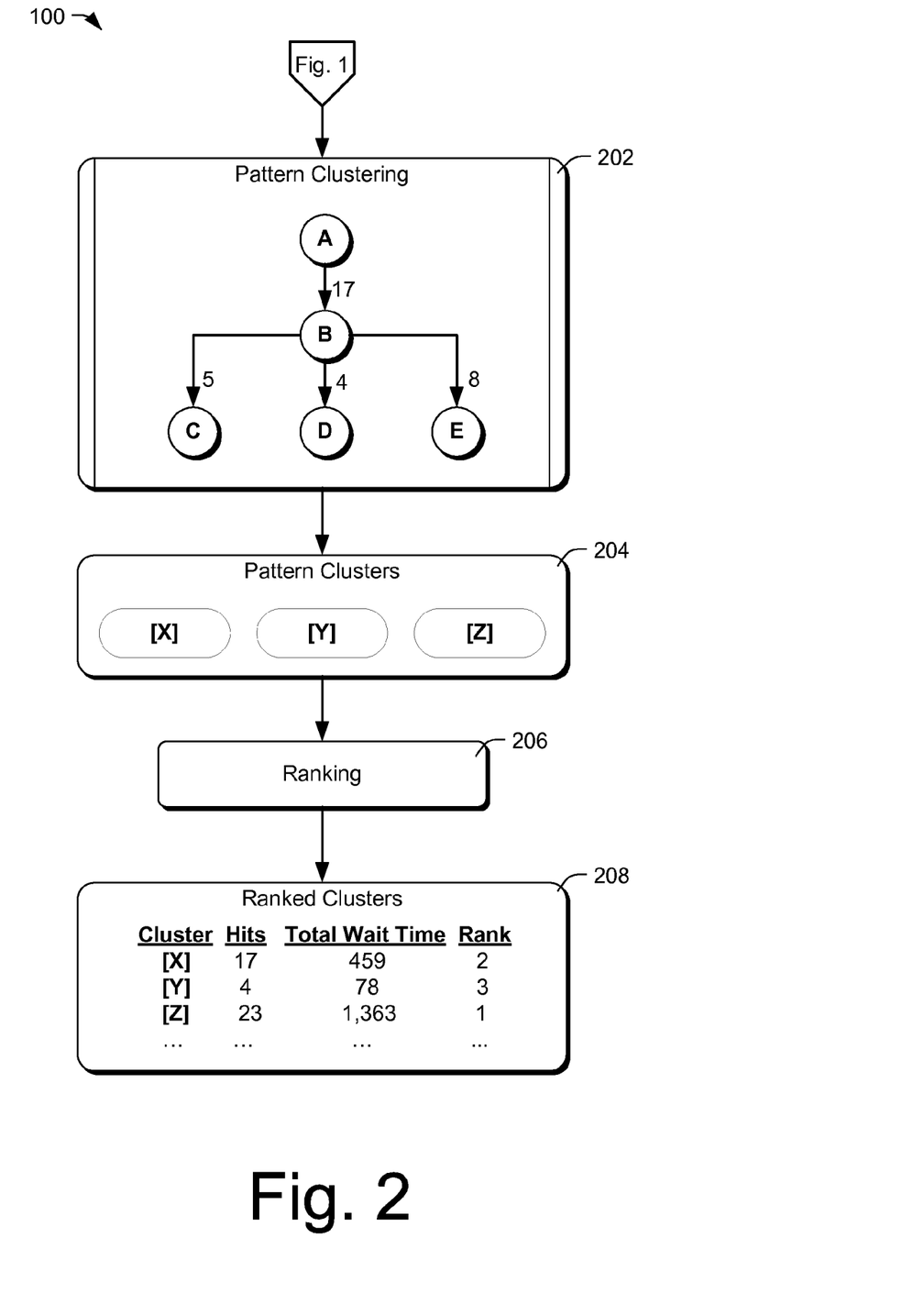

FIGS. 1 and 2 illustrate an example process 100 for analyzing system traces to identify problematic execution patterns. The process begins with a collection of execution traces or logs 102, corresponding respectively to individual execution instances. Each trace contains one or more event logs, and indicates one or more chronological listings of events that might be useful to an analyst or debugger. More specifically, each trace includes one or more chronologies of function calls that occurred during the time period relevant to the performance issue.

In FIG. 1, the execution traces or logs 102 are represented as horizontal timelines. In many cases, it is possible to identify portions of the timelines that are particularly relevant. Such portions are indicated by solid bold lines, and are referred to herein as regions of interest.

A preliminary action 104 comprises parsing and filtering the execution traces 102 to produce one or more call stacks 106. Each of the call stacks is a chronology of function calls that occurred in an execution instance during regions of the corresponding execution trace that have been identified as regions of interest. The filtering of action 104 can in many cases be performed automatically or programmatically, based on previously stored input from human analysts. Over time, for example, analysts may indicate various different functions, function patterns, and call stacks as being irrelevant, and these may be automatically filtered.

A subsequent action 108 comprises mining the call stacks 106 to identify frequently occurring function call patterns 110 within the call stacks. For example, a function call pattern 110(a) comprises the ordered sequence of functions A, B, and C. This pattern occurred 5 times (indicated below the pattern 110(a)). A function call pattern 110(b), comprising the ordered sequence of functions A, B, and D, occurred 4 times. A function call pattern 110(c), comprising the ordered sequence of functions A, B, and E, occurred 8 times. As illustrated by function call pattern 110(c), the individual functions of a pattern need not occur contiguously—there may be intervening functions.

In some embodiments, the pattern mining 108 can be performed using known frequent pattern mining algorithms. However, the potentially large size of the data set, comprising thousands or millions of call stacks, can make such pattern mining difficult. Accordingly, a two-layer pattern mining technique is used to identifying frequently occurring patterns. Details regarding this technique will be described in more detail below.

Moving to FIG. 2, which is a continuation of FIG. 1, an action 202 comprises clustering the function call patterns according to their degrees of similarity. This example shows a cluster created by seventeen occurrences of different but similar function call patterns, all of which begin with the ordered sequence of function A followed by function B. These occurrences represent 3 patterns: a first pattern A-B-C contains 5 occurrences; a second pattern A-B-D contains 4 occurrences; and a third pattern A-B-E contains 8 occurrences.

Clustering can be performed in accordance with conventional techniques, or utilizing the specialized modeling and learning techniques described below, and results in a plurality of clusters 204. In this case, clusters [X], [Y], and [Z] are shown. Each cluster corresponds to a plurality of similar call patterns.

An action 206 comprises ranking the clusters in accordance with the number of times they occur in the available execution instances, or as a combination of the number of occurrences and the total wait time incurred due to the occurrences. This produces a listing of ranked clusters 208. The rankings help analysts to more effectively discover and prioritize problematic execution patterns. More specifically, analysts may choose to prioritize the clusters having the highest priorities, and to investigate the execution instances associated with the function call patterns of those clusters.

Sequence Pattern Mining

The pattern mining 108 can be performed using various different algorithms An example of such a method is described in this section. Sequence pattern mining against a large database is computationally intense, and is sometimes performed by utilizing a number of parallel computers, with different parts of the mining task being partitioned to each computer. In these implementations, the different computers or computing nodes often access a common database. One computing node is typically selected as the primary or head node, and coordinates the tasks of the other nodes.

A traditional approach to distributing tasks among computing nodes might be to partition the search space into many sub-search spaces, and utilize available computing nodes to search the partitions in parallel. However, it can be difficult to predict the amount of work that will be involved in processing any particular partition, and it is therefore difficult to create partitions in such a way that each computing node will have the same amount of work. Unbalanced partitioning tends to decrease the efficiency of the parallel mining algorithms.

In certain embodiments, frequent pattern mining may be conducted using a two-layer architecture. A first level of tasks is distributed to a plurality of computing nodes: the search space is partitioned, and one or more of the resulting partitions are assigned to each of the computing nodes. Each computing node has a plurality of processors.

A second level of tasks is distributed to the processors within the computing nodes: the partition of the search space assigned to a particular computing node is sub-partitioned, and one or more sub-partitions are assigned to each of the processors of the computing node.

Figure 3:
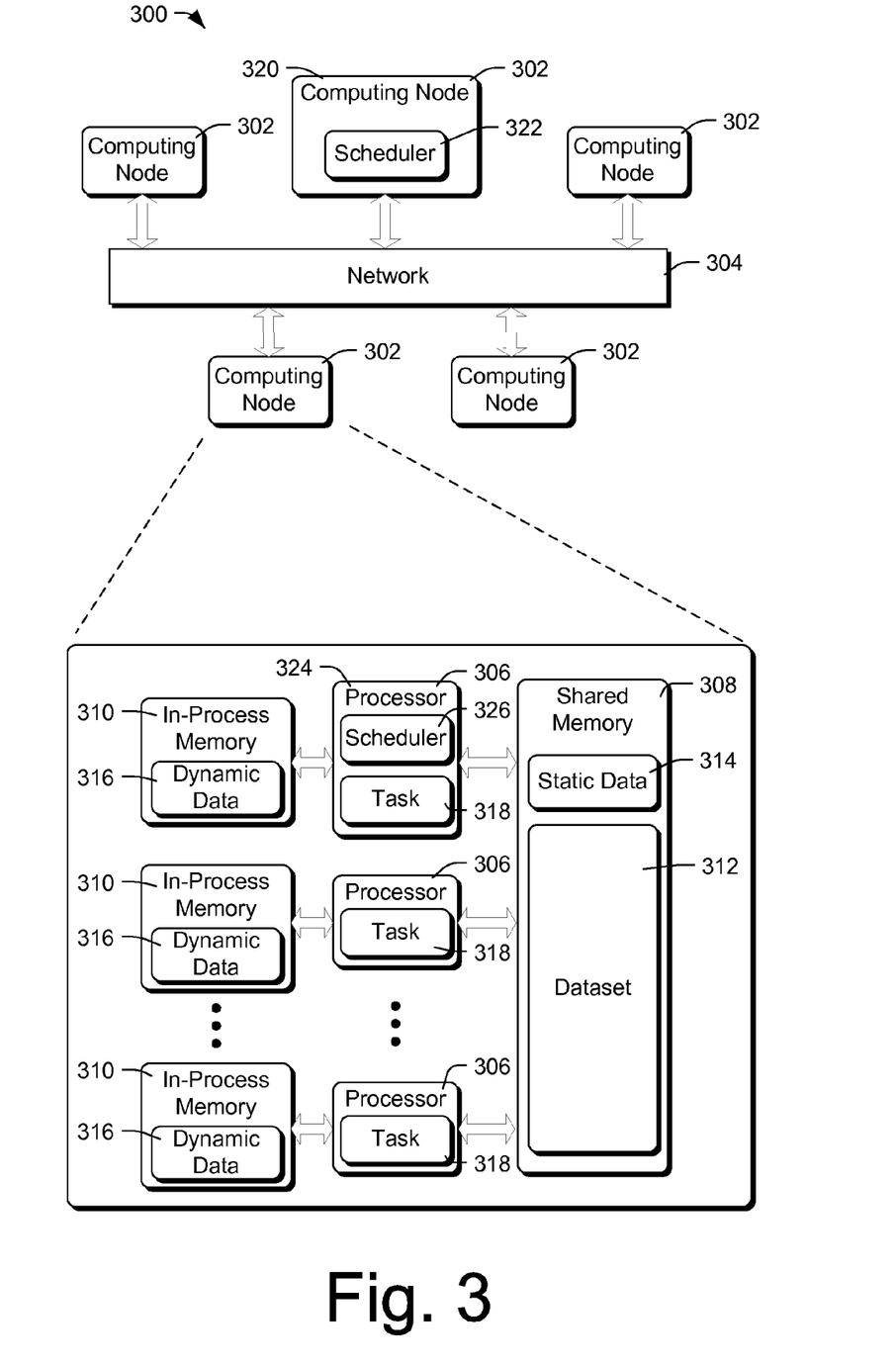
FIG. 3 is a block diagram of an example system for mining frequently occurring patterns.

FIG. 3 shows an example of a computer system 300 configured to perform frequent pattern mining among items of a data set. The computer system 300 includes two levels or layers of computing entities. At a first level, a plurality of computing nodes 302 communicate with each other over a network 304 or other type of communication channel. At a second level, each of the computing nodes 302 has multiple processors that perform portions of the frequent pattern mining.

The lower portion of FIG. 3 shows an example configuration of a single computing node 302. Each of the computing nodes 302 has generally the same configuration.

Each computing node 302 may comprise a conventional computer having multiple processors or CPUs (central processing units) 306. For example, a single computing node may utilize 16 or more processors. Each computing node 302 may also have various types of memory, some of which may be used or allocated as shared memory 308 and as in-process memory 310.

The shared memory 308 and in-process memory 310 in many embodiments may comprise electronic and/or semiconductor memory such as volatile, randomly-addressable memory or RAM that is accessible locally to the computing node 302 by means of a local bus or communications channel (not shown). This type of memory is frequently referred to as the computer's "RAM," and in many embodiments will be formed by high-speed, dynamically-refreshed semiconductor memory.

Each computing node 302 may also have access to other types of memory (not shown), including read-only memory (ROM), non-volatile memory such as hard disks, and external memory such as remotely located storage, which may provide access to various data, data sets, and databases. Various computing nodes 302 may also be capable of utilizing removable media.

In the described embodiment, the shared memory 308 is accessible concurrently by all of the processors 306, and contains a data set 312 which is to be the object of a frequently-occurring pattern search. The data set 312 may in some embodiments take the form of a structured database. For example, the data set 312 may comprise a SQL (structured query language) database or some other type of relational database that is accessible using conventional database query languages.

The data set 312 contains a plurality of data items, and each data item is formed by one or more elements. The individual data items may comprise text, strings, records, and so forth. Elements within data items may comprise characters, words, lines, names, etc. The object of frequent pattern mining is to identify patterns of elements that occur frequently in different items of the data set. For example, it may be desired to find the sequences of characters that occur most frequently in string items, or to find frequently occurring sequences of function names that occur in program execution logs.

The shared memory 308 may also contain pre-calculated, static data 314 related to or used by frequent pattern mining algorithms.

Both the data set 312 and the pre-calculated, static data 314 may be accessed by any of the processors 306.

Because of the decreasing cost and increasing densities of computer memory, the shared memory 308 may be quite large. In current embodiments, the combined shared memory 308 and in-process memory 310 may be 48 gigabytes or more, which is large enough to contain a very large data set without needing memory swapping or paging. Future technologies will undoubtedly increase the practical amounts of RAM available within single computing nodes.

While the shared memory 308 is accessible in common by the multiple processors 306, each instance of the in-process memory 310 is dedicated and private to an individual one of the processors 306 or to one or more of the processes being executed by the processors. The in-process memory 310 stores dynamic variables 316 and other data that may be generated and maintained by processes executed by the processors 306. Note that the in-process memory 310 may in some embodiments include paged memory.

The embodiment described herein utilizes task partitioning, so that frequent pattern mining can be partitioned and performed in parallel by different computing nodes 302 and processors 306. Using this approach, each processor 306 of a single computing node 302 has access to all records or data items of the data set, but is responsible for a different portion or partition of the search space.

Tasks are assigned in two stages. At a first stage, the work of a frequent pattern search is divided into multiple tasks, which are assigned to computing nodes. At a second stage, each of these tasks is divided into sub-tasks, which are assigned to individual processors of the computing nodes. The task division may be performed at a level of granularity that allows a number of tasks or sub-tasks to be reserved for future assignment as computing nodes or processors complete their current assignments.

Each task involves searching for frequent patterns in a partition or sub-partition of the overall search space. Partitioning and sub-partitioning are performed with an effort to produce partitions and sub-partitions of equal size, so that computing nodes and processors are assigned equal amounts of work. To account for estimation inaccuracies, initial partitions and sub-partitions can be made sufficiently small so that some partitions and sub-partitions are held in reserve, for future assignment. When a computing node or processor completes its current assignment, it may request a further assignment. This request may be satisfied by the assignment of an as-yet unassigned partition or sub-partition, if available. If no unassigned partitions or sub-partitions are available, the system may re-partition or sub-partition an existing assignment, and may reassign one of the resulting partitions or sub-partitions to a requesting computing node or processor.

The searching itself can be performed in different ways, using various algorithms. For example, certain embodiments may utilize the frequent pattern mining algorithm described in the following published reference:

Jianyong Wang and Jiawei Han. 2004. BIDE: Efficient Mining of Frequent Closed Sequences. In *Proceedings of the 20th International Conference on Data Engineering* (ICDE '04). IEEE Computer Society, Washington, D.C., USA, 79-.

Other algorithms might also be used.

A frequent pattern mining algorithm such as this involves building a hierarchical pattern tree by exploration, starting with high levels and building through lower and yet lower levels.

Figure 4:
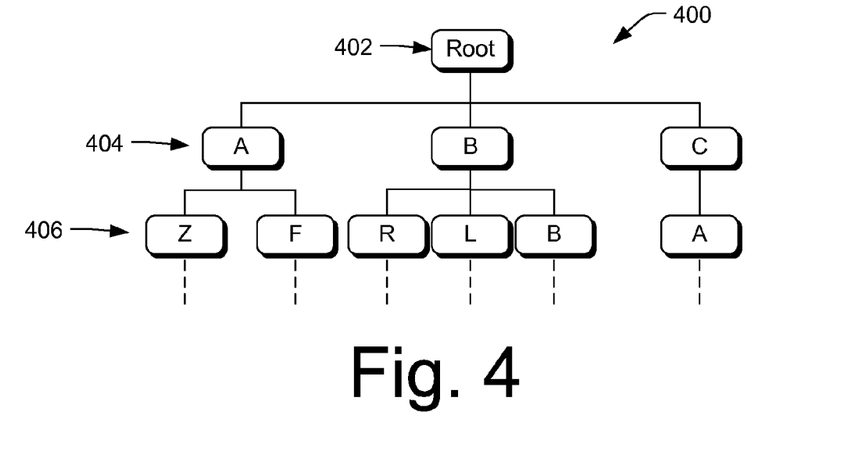
FIG. 4 is a schematic diagram illustrating a frequent pattern search technique.

FIG. 4 illustrates an initial or early definition of a pattern search space 400. The search space begins at an empty root level 402. Exploration of data items (which in this example are strings) reveals a first level 404 of the search space, with nodes corresponding to characters that may form the first elements of frequently occurring element patterns: "A", "B", and "C". Further exploration of the data items identifies a second level 406 of the search space, having nodes corresponding to characters that may follow the initial characters of the first level 404. For example, the characters "Z" and "F" have been found in the data set to follow occurrences of "A". The second level can alternatively be viewed as having nodes that correspond to sub-patterns, where the sub-pattern corresponding to a particular node is a concatenation of the elements of those nodes found along the path from the root node to the particular node. For example, a first-level node may corresponds to the pattern "A", and the second level nodes below the first-level node "A" might correspond to sub-patterns "AZ" and "AF", respectively.

Dashed lines leading from the nodes of the second level 406 indicate the possible existence of yet lower-level nodes and sub-patterns, which are as yet unexplored and thus unknown.

A node having dependent nodes can be referred to as a parent node. Nodes that depend from such a parent node can be referred to as child nodes or children. A node is said to have "support" that is equal to the number of data items that contain the sub-pattern defined by the node. In many situations, "frequently" occurring patterns are defined as those patterns having support that meets or exceeds a given threshold.

Given a search space definition as shown in FIG. 4, further exploration can be partitioned into separate tasks corresponding to the nodes of one of the levels of the defined space 400. For example, further exploration can be separated into three tasks corresponding to the three first-level nodes "A", "B", and "C". Each task is responsible for finding sub-patterns of its node. Alternatively, the further exploration might be partitioned into six tasks, corresponding to the nodes of the second level 406 of the search space. This type of partitioning can be performed at any level of the search space, assuming that exploration has been performed to reveal that level of the search space.

Referring again to FIG. 3, each of the processors 306 may be configured to execute a frequent pattern searching algorithm in a search task or process 318. In the described embodiment, the search space is partitioned as described above, and partitions of the frequent pattern search are assigned to each of the computing nodes 302. Sub-partitions of these partitions are then defined, based on lower-level nodes of the search space, and are assigned as tasks to each of the processors 306. Each processor conducts its sub-partition of the search against the data set 312, which is stored in the shared memory 308.

Note that in this embodiment, the entire data set 312 (containing all data items) is replicated in the shared memory 308 of each computing node 302, so that each search task 318 has access to the entire data set.

The computing nodes 302 include a head node 320 that executes a scheduler 322 to allocate partitions of the frequent pattern search to individual computing nodes 302. In addition, the processors 306 of each computing node 302 include a head processor 324 that executes a scheduler 326 to allocate sub-partitions of the frequent pattern search to individual processors 306 of the computing node 302. The head node 320 and the head processors 324 also dynamically reallocate the portions and sub-portions of the pattern search upon demand. Reallocation takes place first among the processors 306 of individual computing nodes 302, and secondarily among the computing nodes 302 when reallocation within a computing node is undesirable or impractical.

Figure 5:
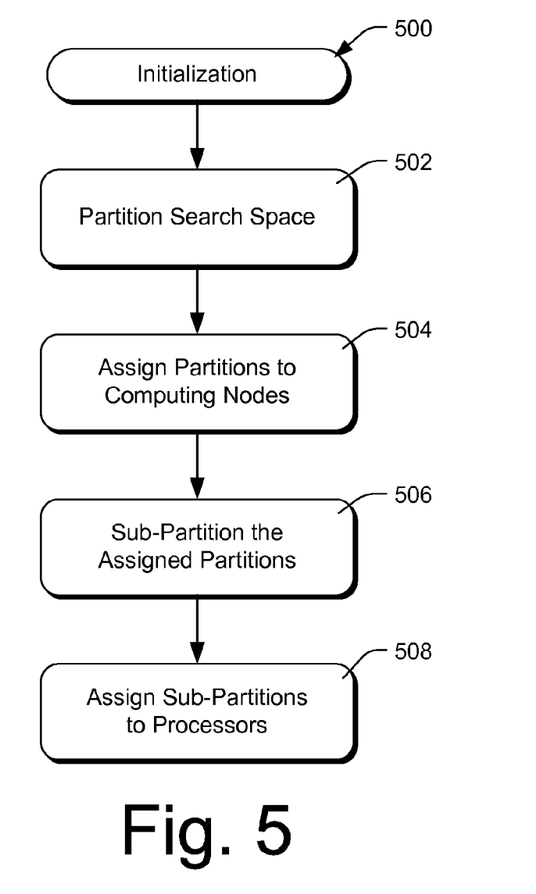
FIG. 5 is a flow diagram showing a procedures for partitioning and assigning a frequently occurring pattern search to multiple computing nodes and processors.

FIG. 5 illustrates an initial assignment or allocation 500 of tasks to computing nodes 302 and their processors 306. An action 502 comprises partitioning the overall search space into a plurality of partitions. This is performed as described above, by exploring and growing the search space to a predetermined level of granularity. In most cases, relatively high level nodes will be used to define the initial partitions of action 502.

At 504, the head node 320 assigns one or more of the initial partitions to each of the computing nodes 302. All identified partitions may be assigned at this point, or some partitions may be reserved for future assignment when individual computing nodes complete their initial assignments.

At 506, the head processor 324 of each computing node 302 sub-partitions any partitions that have been assigned to it, creating multiple sub-partitions. The head processor 324 uses techniques similar to those used by the head computing node 320 to identify sub-partitions, by exploring and growing the search space to identify sub-nodes or next-lower level nodes—nodes at a level or levels below the search space levels that were used by the head computing node 320 to identify the initial partitions. At 508, the sub-partitions are assigned to individual processors 306 of the computing nodes, by the head processor 324 of each computing node. All of the identified sub-partitions may be assigned at this point, or some sub-partitions may be reserved for future assignment when individual processors complete their initial assignments.

Figure 6:
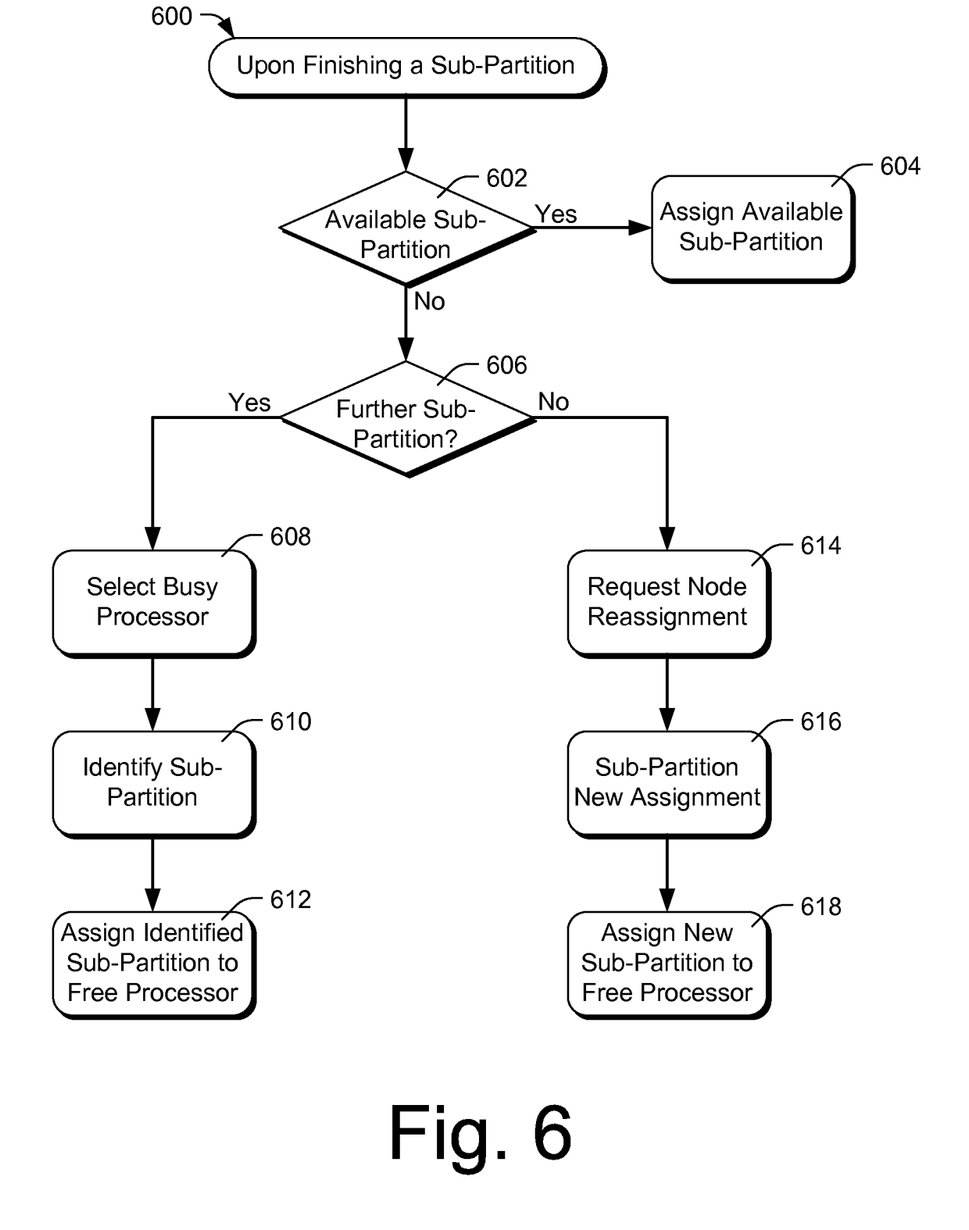
FIG. 6 is a flow diagram illustrating reallocation of search sub-partitions among processors of a computing node.

FIG. 6 illustrates an example process 600 for dynamically reallocating sub-partitions to individual processors 306. This process is initiated when a processor completes its current assignment, and thus runs out of work to perform. These actions are performed by the scheduler 326 of an individual computing node 302. The processor 306 that has run out of work will be referred to as a free processor. Other processors within the computing node will be referred to as busy processors.

At 602, the scheduler 326 determines whether any sub-partitions remain unassigned, resulting from any previous sub-partitioning efforts. If so, an action 604 is performed, comprising assigning one of these available sub-partitions to the free processor. The free processor commences searching in accordance with the assignment.

If there are no remaining unassigned sub-partitions, the scheduler determines at 606 whether it is desirable for one of the busy processors to relinquish part if its previously allocated sub-partition. This can accomplished by querying each of the busy processors to determine their estimated remaining work. Whether or not it is desirable to further sub-partition the work currently being processed by a busy processor is evaluated primarily based on the estimated work remaining to the busy processor. At some point, a processor will have so little work remaining that it will be inefficient to further sub-partition that work.

If at 606 there is at least one busy processor with sufficient remaining work that it would be efficient to sub-partition that remaining work, execution proceeds with the actions shown along the left side of FIG. 6. An action 608 comprises selecting one of the busy processors 306. This may be accomplished by evaluating the work remaining to each of the processors, and selecting the processor with the most remaining work.

At 610, the scheduler 326 or the selected busy processor itself may sub-partition the remaining work of the busy processor. For example, the remaining work may be sub-partitioned into two sub-partitions, based on currently known levels of the search space that the busy processor is currently exploring. At 612, one of the new sub-partitions is assigned to the free processor.

If at 606 there is not at least one busy processor with sufficient remaining work that it would be efficient to sub-partition that remaining work, execution proceeds with the actions shown along the right side of FIG. 6. An action 614 comprises requesting a new partition assignment or reassignment from the scheduler 322 of the head node 320. An action 616 comprises sub-partitioning the new assignment, using the techniques already described. An action 618 comprises assigning one of the resulting sub-partitions to the free processor. The remaining sub-partitions are held by the scheduler 326 for future assignment to other processors as they complete their current assignments.

Figure 7:
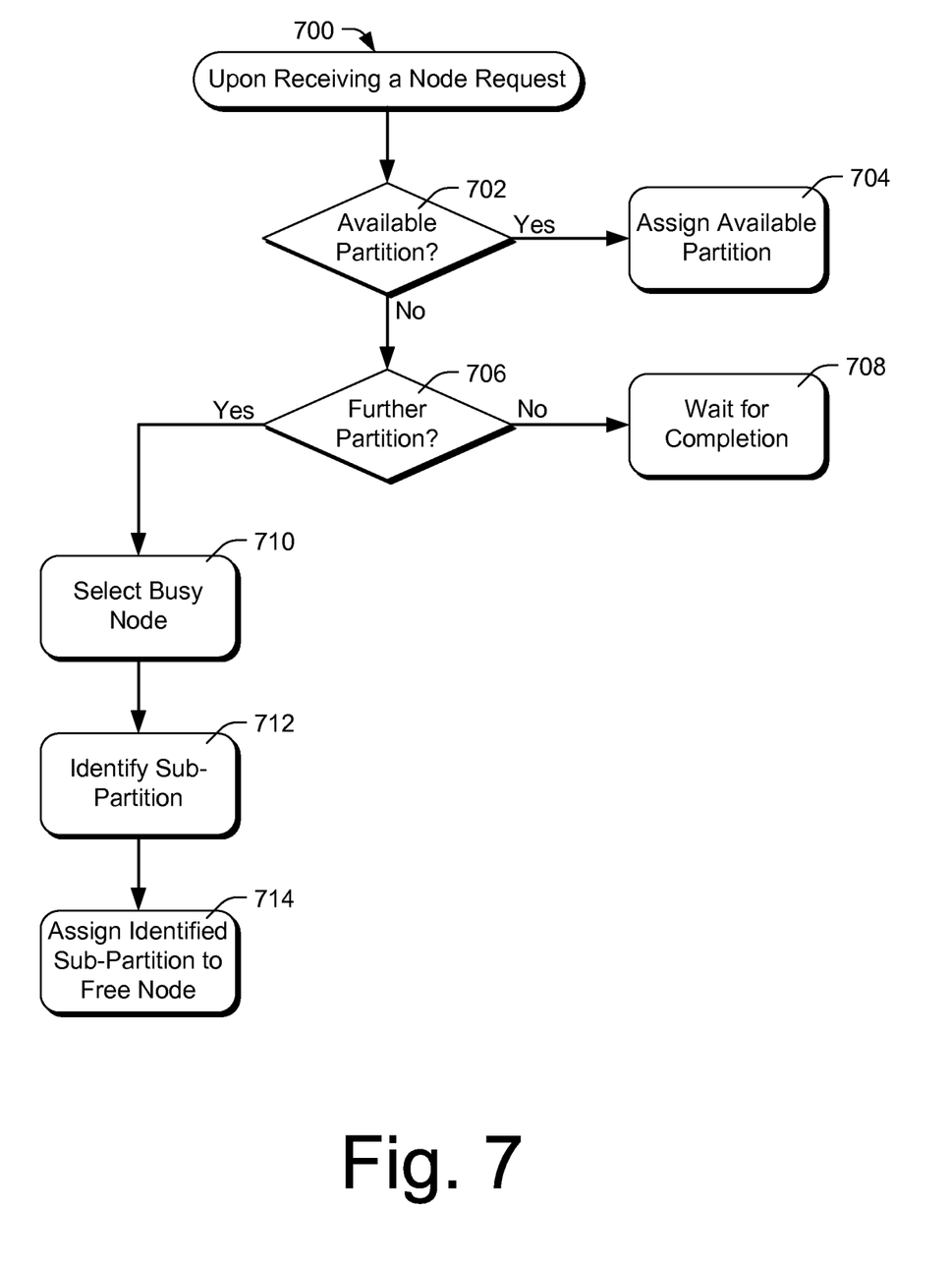
FIG. 7 is a flow diagram illustrating reallocation of search partitions among computing nodes.

FIG. 7 illustrates an example process 700 for dynamically reallocating search space partitions to individual computing nodes 302. This process is initiated upon receiving a request from a computing node, such as indicated at 614 of FIG. 6. These actions are performed by the scheduler 322 of the head node 320. The requesting computing node 302 that has run out of work will be referred to as a requesting computing node. Other computing node will be referred to as busy computer nodes.

At 702, the scheduler 322 determines whether any partitions remain unassigned, resulting from any previous partitioning efforts. If so, an action 704 is performed, comprising assigning one of these available partitions to the free computing node. The free computing node commences searching in accordance with the assignment, as described with reference to FIG. 6.

If there are no remaining unassigned partitions, the scheduler determines at 706 whether it is desirable for one of the busy computing nodes to relinquish part if its previously allocated partition. This can accomplished by querying each of the busy computing nodes to determine their estimated remaining work. Whether or not it is desirable to further partition the work currently being processed by a busy computing node is evaluated primarily based on the estimated work remaining to the busy computing node. At some point, a computing node will have so little work remaining that it will be inefficient to further partition that work. Note also that reassigning work from one computing node to another involves the busy computing node reassigning or redistributing work to among its individual processors.

If at 706 there is not at least one busy computing node with sufficient remaining work that it would be efficient to partition that remaining work, an action 708 is performed of simply waiting for the remaining computing nodes to complete their work. Otherwise, execution proceeds with the actions shown along the left side of FIG. 7. An action 710 comprises selecting one of the busy computing nodes 302. This may be accomplished by evaluating the work remaining to each of the computing nodes, and selecting the computing node with the most remaining work.

At 712, the scheduler 322 or the selected busy computing node itself may partition the remaining work of the busy computing node. For example, the remaining work may be partitioned into two sub-partitions, based on currently known sub-levels of the search space that the busy processor is currently exploring. At 714, one of the sub-partitions is assigned to the free computing node.

Using the techniques described above, reassignment of partitions and sub-partitions is performed dynamically, and is initiated when a processor or computing node completes its current assignment.

Partitioning, assignment, and reassignment may involve evaluating the amount of work associated with individual partitions or sub-partitions—also referred to as the "size" of the partition or sub-partition. In practice, the actual size of any partition is unknown, because that partition has not yet been fully explored, and only a complete exploration will reveal the size. However, partition and sub-partition sizes can be estimated or predicted.

More specifically, each partition or sub-partition may correspond to a sub-pattern of the search space. The support of the sub-pattern—the number of data items that contain the sub-pattern—is used on some embodiments as an estimate of the size of the partition. Partitions with higher support are predicted be larger than partitions with lower support. Alternatively, the sum of supports of the next-lower level nodes of the search space may be used to estimate the size of the sub-pattern. As a further alternative, for example when the algorithm in the reference cited above is used, the average sequence length of the projection database of immediate next-lower level nodes of the search space may be used as an indication or estimate of partition size.

Other types of estimations may be used in other embodiments.

Generally, reallocations and reassignments should be performed according to criteria that account for efficiency. For example, reassignments among the processors of computing nodes should be performed at a higher priority than reassignments among computing nodes. Furthermore, any reassignments should be performed in a way that contributes to balanced workloads among the processors and computing nodes. Also, granularity of reassignments should not be too small, because each reassignment involves significant overhead.

In some embodiments, the schedulers 322 and 326 may monitor remaining workload of the various computing nodes and processors. When work is reallocated, the schedulers account for this in their estimations. Furthermore, the schedulers may maintain estimation models to predict the remaining work of individual computing nodes and processors. The estimation models may be updated or adjusted in response to actual performance of the searching, so that the models become more accurate over time.

Clustering

Figure 8:
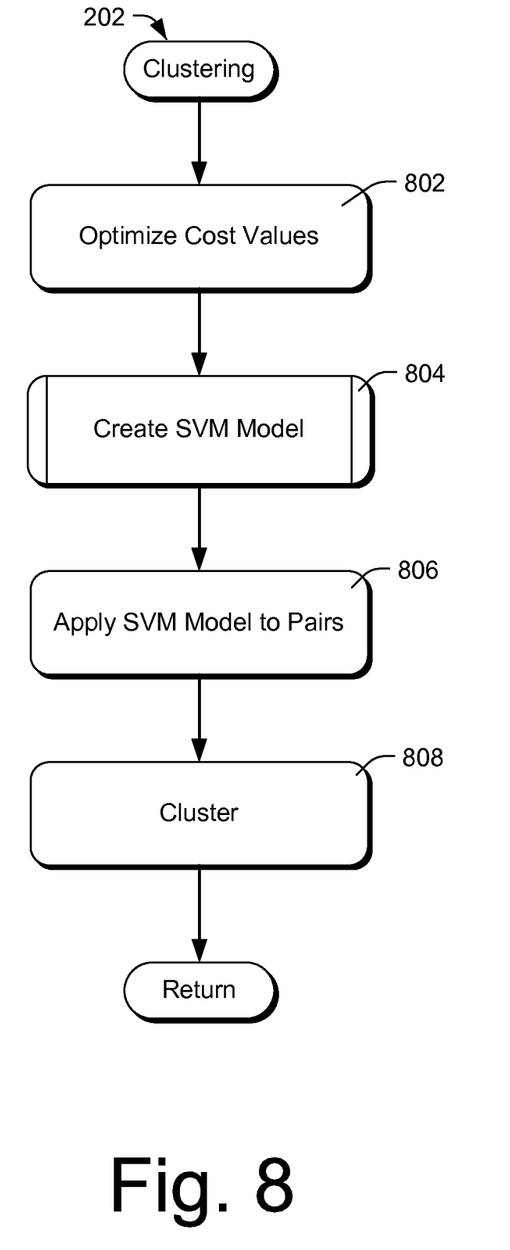
FIG. 8 is a flow diagram illustrating call pattern clustering techniques that may be used to analyze computer performance issues.

FIG. 8 illustrates an example of the previously mentioned process 202 of clustering the frequently occurring function call patterns 110, which have been mined and identified as described above. The objective of this process is to identify clusters of similar function call patterns, wherein each cluster is likely to correspond to a particular problematic program execution pattern.

In the described embodiment, pattern similarity is derived at least in part from a form of edit distance evaluation. Given a pair ($P_j$) of function call patterns $S_{j1}$ and $S_{j2}$, in order to change $S_{j1}$ into $S_{j2}$, edit distance evaluation involves three kinds of operations:

$A_1$:insert
$A_2$:delete
$A_3$:modify

Different costs can be assigned to the above three kinds of operations, i.e. $\{c_i = \text{Cost of } A_i\}$, let $x_{ij} = \#$ of $A_i$ in $P_j$, then the total cost of $P_j$ can be defined as $C(P_j) = \Sigma_i c_i x_{ij}$.

Some of the actions described below will depend on the numbers $x_i$ of inserts, deletes, and modifies performed in order to align the two patterns of a pair. However, such $x_i$ values should be calculated in light of optimized cost values c. Otherwise, the system may in some cases choose inappropriate operations. For example, the analysis might select to delete and insert rather than to modify, even though a modify operation may be more efficient.

Referring to FIG. 8, an action 802 comprises identifying optimized cost values $c_1$, $c_2$, and $c_3$. This can be accomplished by minimizing the total cost sum of all available function call pairs under certain constraints as follows:

$$\min \Sigma_j \Sigma_i c_i x_{ij}$$
$$\text{subject to: } \sum \frac{1}{c_i} = 1$$

in which, $x_{ij}$ (i=1, 2, 3) denotes the number of the operations for inserting, deletion and modification for the $j^{th}$ pair of function calls, respectively, and $c_i$ (i=1, 2, 3) denotes the corresponding costs. The Lagrange multiplier method can be used to solve this formula as:

$$\min \Sigma_j \Sigma_i c_i x_{ij} - \lambda \left(1 - \sum \frac{1}{c_i}\right)$$

Thus, for a given $x_{ij}$, the optimal $c_i$ is:

$$c_i = \frac{\Sigma_i \sqrt{\Sigma_j x_{ij}}}{\sqrt{\Sigma_j x_{ij}}}$$

However, when $c_i$ changes, the optimum $x_{ij}$ to minimize the total cost sum also changes. Accordingly, both c and x are optimized by iteratively performing the expectation-maximization (EM) algorithm as follows:

(a) Arbitrarily initialize $c_i^0$ subject to $$\sum \frac{1}{c_i^0} = 1;$$

(b) Calculate edit distance with the given $c_i^t$, and get $x_{ij}^{t+1}$;
(c) Calculate the optimal $c_i^{t+1}$ with the given $x_{ij}^{t+1}$;
(d) If $c_i^t x_{ij}^t - c_i^{t+1} x_{ij}^{t+1} < \epsilon$, then exit the algorithm, else go to (b).

in which $\epsilon$ is a specified margin, which represents the threshold of cost gain in the termination condition.

In addition to the number of insert, delete, and modify operations involved in aligning two function call patterns, the edit distance can be augmented by additional features that account for the relative significance of certain functions and function sequences in this particular environment. For example, some functions may appear in very few function call patterns, and may therefore be of relatively higher significance. Similarly, certain sequential pairs of function calls may occur very infrequently, and may therefore be particularly significant when they do occur. This information may be captured by introducing two additional features, relating to unigrams and bigrams of the function calls.

In particular, let $F_0$ represent the set of functions within a pair of function call patterns that are identical—those functions for which no insert, delete, or modify operations are necessary. For a function call pair $P_j$, let $x_{4,j}$ represent the average of the global frequencies of the unigrams occurring in $F_0$, and let $x_{5,j}$ represent the average of the global frequencies of the bigrams occurring in $F_0$; where global frequency is the percentage of all identified function call patterns (or a representative sample set of the available function call patterns) in which the particular unigram or bigram occurs.

In light of these additionally defined features, function call pair $P_j$ can be represented as the combination of $\{x_{ij}|i=1, 2, 3, 4, 5\}$ and their associated cost coefficients $\{a_i|i=1, 2, 3, 4, 5\}$. In one implementation, it can be the linear combination, i.e.

$$D(P_j) = \sum_{i=1}^{5} a_i x_{ij}$$

in which the coefficients $a_i$ are derived from the training described below.

An action 804 comprises creating or learning a support vector machine (SVM) model that can be subsequently used to classify pairs of function call patterns. The learning can be based on training data that has been manually classified by analysts. For example, a pair of function call patterns can be manually classified by a human analyst as being either similar or dissimilar. Each such pair is represented as a training example $(X_j, y_j)$, in which $X_j=[x_{1j}, x_{2j}, x_{3j}, x_{4j}, x_{5j}]$ (derived and calculated as described above) and $y_j$ denotes whether the pair is similar or dissimilar. After learning, the SVM model can be used as a classifier to calculate distances or similarity measurements corresponding to all call pattern pairs, based on the vectors $[x_{1j}, x_{2j}, x_{3j}, x_{4j}, x_{5j}]$ corresponding to each call pattern pair $P_j$.

An action 806 comprises applying the SVM model to individual pairs of the function call patterns, to calculate distances or similarity measurements corresponding to all identified pairs of function call patterns. A typical SVM model may produce classification values v having values less than −1 for dissimilar pairs and values greater than +1 for similar pairs. The distance between the two patterns of a pair can be calculated $$d = \frac{1}{1+e^v}.$$

At 808, traditional hierarchical clustering algorithms can be used to segregate the various function call patterns into clusters. Such clustering can be based on the distance measurements d, corresponding respectively to each call pattern pair, resulting from the application of the learned SVM model to the different call pattern pairs.

Figure 9:
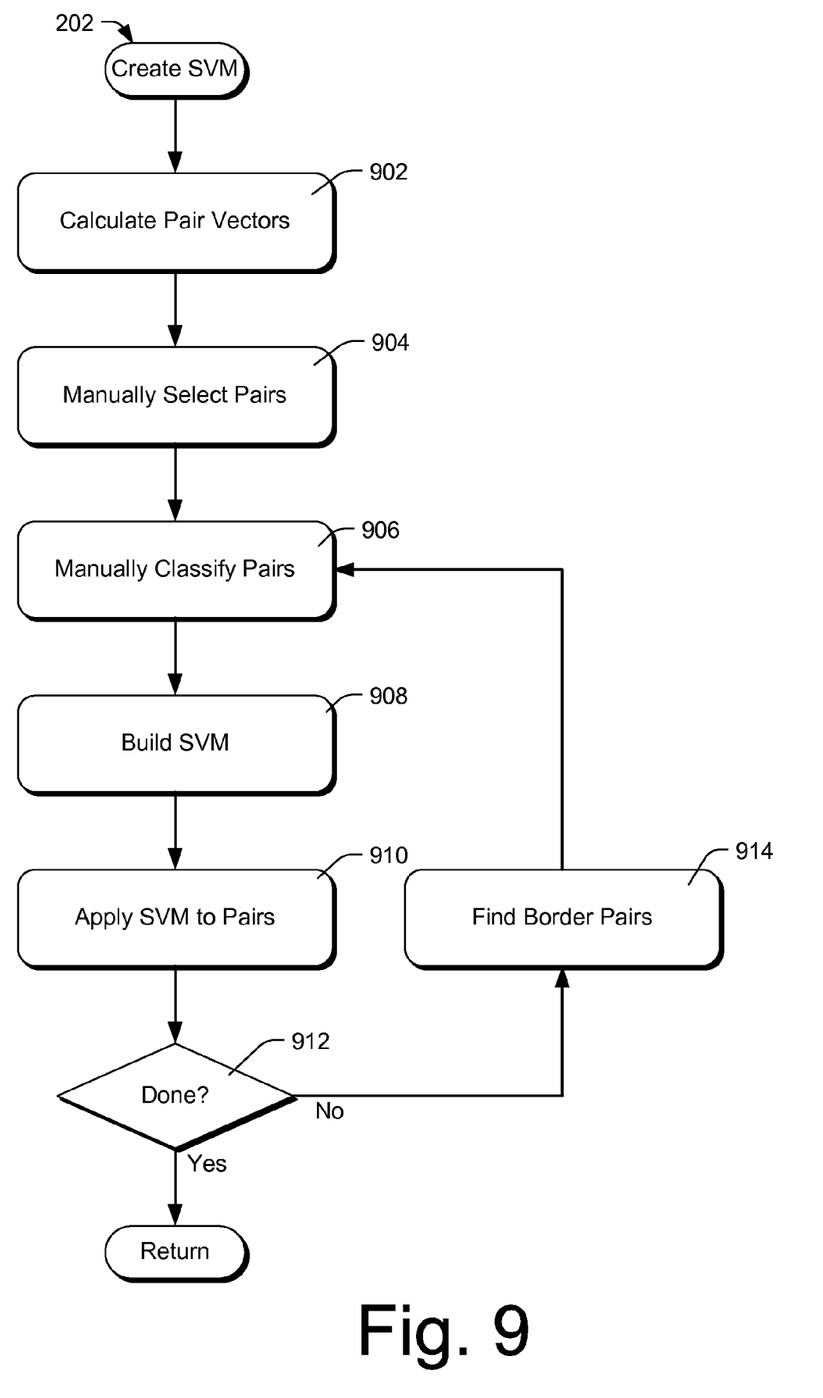
FIG. 9 is a flow diagram illustrating an example technique for training an SVM (support vector machine) classifier.

FIG. 9 shows an example of the process 202 of creating or learning an SVM model. An action 902 comprises calculating pair vectors for all possible pairs of function call patterns. The pair vector for a particular pair $P_j$ comprises $X_j=[x_{1j}, x_{2j}, x_{3j}, x_{4j}, x_{5j}]$, as described above. The values $x_{1j}, x_{2j},$ and $x_{3j}$ are calculated in light of the cost values $c_1, c_2$ and $c_3$, calculated as described above. The values $x_{4j}$ and $x_{5j}$, are also calculated as described above, based on frequency of unigrams and bigrams.

An action 904 comprises manually and/or randomly selecting a relatively small number of call pattern pairs for human analysis. An action 906 comprises manually classifying the selected call pattern pairs. This can be performed by an analyst, based on his or her opinion or evaluation regarding the similarity of each call pattern pair. In some embodiments, the classification can be binary: the analyst simply indicates whether or not two function call patterns are likely to be caused by the same problematic program execution pattern.

The classification performed by human analysts results in training data $(X_j, y_j)$ as described above for each of the pattern pairs $P_j$ that have been manually classified.

An action 908 comprises building an SVM model based on the training data. More specifically, an SVM projection d=f(X) is learned using known SVM techniques: the so-called "kernel trick" can be used to translate the features of each pair into linearly separable higher dimensions, allowing the manually classified pairs to be projected into one dimension.

At 910, the SVM model is applied to all possible pairs of identified function call patterns (including those that have not been manually classified) to produce distance measurements d for each call pattern pair. Application of the SVM model to a particular pair relies on the pair vectors calculated at 502.

Actions 906, 908, and 910 are iterated to refine the SVM model. To this end, an action 912 comprises determining whether actions 906, 908, and 910 have been sufficiently iterated, and whether the process of building the SVM is therefore complete. This determination may be made by the human analysts as the process proceeds.

If further iteration is to be performed, an action 914 comprises identifying a number n of call pattern pairs that lie closest to the boundary of the learned SVM model. These represent pairs for which there was some degree of ambiguity in classification. In other words, the SVM model was unable to classify these pairs without ambiguity. These n pattern pairs are then submitted to human analysis at 906, to determine whether the n pairs should correctly be classified as similar or dissimilar, and the actions 908 and 910 are repeated.

In each iteration, action 906 is performed, comprising rebuilding the SVM based on the pairs that have been manually classified to this point. The new SVM model is then applied to the remaining, unclassified pairs.

At each iteration, human analysts at 912 may examine the border pairs reported by action 914 to evaluate whether the SVM model has been sufficiently evolved. In some experiments, approximately 40 call pattern pairs were selected during each iteration, and fewer than 10 iterations were performed in order to sufficiently train the SVM model.

Example Computing Device

Figure 10:
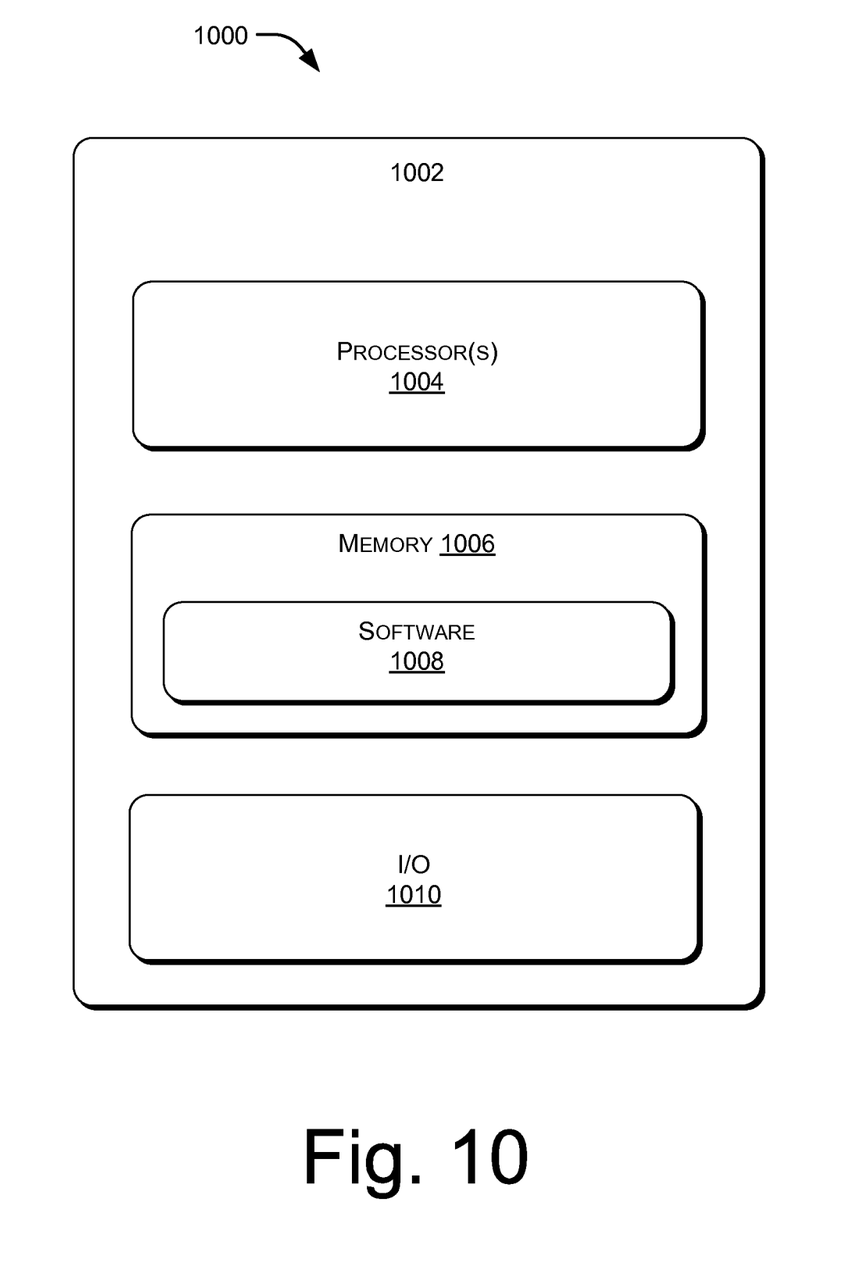
FIG. 10 is a block diagram of a system that can be used to implement the techniques described herein.

FIG. 10 shows relevant high-level components of system 1000, as an example of various types of computing equipment that may be used to implement the techniques described above. In one implementation, system 1000 may comprise a general-purpose computer 1002 having one or more processors 1004 and memory 1006. The techniques described above can be implemented as software 1008, such as one or more programs or routines, comprising sets or sequences of instructions that reside in the memory 1006 for execution by the one or more processors 1004. The system 1000 may have input/output facilities 1010 for providing interacting with an operator and/or analysts.

The software 1008 above may reside in memory 1006 and be executed by the processors 1004, and may also be stored and distributed in various ways and using different means, such as by storage on different types of memory, including portable and removable media. Such memory may be an implementation of computer-readable media, which may include at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A method of identifying issues related to slow performance in computer programs, comprising:
   collecting execution traces from multiple computers, the execution traces corresponding to multiple execution instances that have exhibited slow performance;
   processing the execution traces to identify function call stacks;
   mining the function call stacks to identify function call patterns having a number of occurrences in the function call stacks above a specified threshold identifying clusters of the identified function call patterns based on an automated support vector machine (SVM) classifier; and
   ranking each respective cluster of the clusters based at least in part on a number of occurrences of the identified function call patterns occurring within the respective cluster.

2. The method of claim 1, further comprising training the automated SVM classifier based on human classification of selected pairs of function call patterns.

3. The method of claim 1, further comprising iteratively training the automated SVM classifier based on human classification of selected pairs of function call patterns.

4. The method of claim 1, wherein the automated SVM classifier classifies pairs of function call patterns based on matching unigrams and bigrams of the pairs of function call patterns.

5. The method of claim 1, wherein the automated SVM classifier classifies pairs of function calls based on edit distances between the function call patterns of the pairs of function calls.

6. The method of claim 1, further comprising prioritizing problematic program execution patterns based at least in part upon the ranking of the clusters.

7. The method of claim 1, wherein mining the call stacks comprises:
   assigning partitions of a search space to multiple computing nodes; and
   assigning sub-partitions of the partitions to processors within the multiple computing nodes, wherein the processors within a single computing node of the multiple computing nodes share access to common memory from which the function call patterns are identified.

8. A method of identifying related problematic program execution patterns, comprising:
   collecting execution traces corresponding to multiple execution instances that have exhibited performance problems;
   processing the execution traces to identify call stacks;
   mining the call stacks to identify function call patterns having a number of occurrences in the call stacks above a specified threshold;
   identifying clusters of the identified function call patterns; and
   ranking each respective cluster of the clusters based at least in part on a number of occurrences of the identified function call patterns occurring within the respective cluster.

9. The method of claim 8, wherein identifying the clusters is based at least in part on edit distances between function call patterns.

10. The method of claim 8, wherein identifying the clusters is based at least in part on unigrams and bigrams of function call pattern pairs.

11. The method of claim 8, wherein identifying the clusters is based at least in part on domain knowledge supplied by human analysts.

12. The method of claim 8, wherein identifying the clusters is based at least in part on manual classification of selected pairs of function call patterns by human analysts.

13. The method of claim 8, wherein identifying the clusters further comprises training a support vector machine (SVM) model based at least in part on domain knowledge supplied by human analysts.

14. The method of claim 8, wherein identifying the clusters further comprises iteratively training a support vector machine (SVM) model based at least in part on domain knowledge supplied by human analysts.

15. The method of claim 8, further comprising prioritizing problematic program execution patterns based at least in part upon the ranking of the clusters.

16. The method of claim 8, further comprising identifying groups of execution instances that exhibit common problematic program execution patterns based at least in part on the identified clusters.

17. The method of claim 8, wherein mining the call stacks comprises:
   assigning partitions of a search space to multiple computing nodes; and
   assigning sub-partitions of the partitions to processors within the computing nodes, wherein the processors within a single computing node of the multiple computing nodes share access to common memory from which the function call patterns are identified.

18. One or more computer storage media containing instructions that are executable by a processor to perform actions comprising:
- mining one or more call stacks associated with execution instances to identify function call patterns having a number of occurrences in the one or more call stacks above a specified threshold;
- identifying one or more clusters of the identified function call patterns; and
- ranking each respective cluster of the one or more clusters based at least in part on a number of occurrences of the identified function call patterns occurring within the respective cluster.

19. The one or more computer storage media recited in claim 18, the actions further comprising associating respective clusters having the identified function call patterns with different problematic program execution patterns.

20. The one or more computer storage media recited in claim 18, wherein identifying the one or more clusters uses domain knowledge provided by human analysts.

* * * * *